US006757622B2

(12) United States Patent
Fioravanti

(10) Patent No.: US 6,757,622 B2
(45) Date of Patent: Jun. 29, 2004

(54) PREDICTING DISC DRIVE ACOUSTIC SOUND POWER FROM MECHANICAL VIBRATION

(75) Inventor: Louis J. Fioravanti, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/176,555

(22) Filed: Jun. 20, 2002

(65) Prior Publication Data

US 2003/0142601 A1 Jul. 31, 2003

Related U.S. Application Data

(60) Provisional application No. 60/350,135, filed on Jan. 17, 2002.

(51) Int. Cl.[7] ................................ G01B 5/28
(52) U.S. Cl. ...................................... 702/39
(58) Field of Search ............... 702/39, 19; 382/209; 600/431, 442; 310/338; 341/61; 114/23; 378/94; 360/97.01; 369/47.44; 84/610, 478, 477; 381/56; 361/685; 704/214

(56) References Cited

U.S. PATENT DOCUMENTS

| 4,551,018 A | 11/1985 | Mannava et al. .......... 356/28.5 |
| 4,939,599 A | 7/1990 | Chainer et al. .......... 360/77.03 |
| 5,247,448 A | 9/1993 | Liu ............................ 364/468 |
| 5,524,009 A | 6/1996 | Tuutijarvi et al. .......... 370/95.3 |
| 5,668,680 A | 9/1997 | Tremaine ................. 360/78.07 |
| 5,982,580 A | 11/1999 | Woldemar et al. ....... 360/97.02 |
| 6,023,512 A | 2/2000 | Matsuo et al. ................. 381/17 |
| 6,148,240 A | 11/2000 | Wang et al. .................. 700/63 |
| 6,256,163 B1 | 7/2001 | Schmidt et al. .......... 360/78.09 |
| 2002/0141108 A1 * | 10/2002 | Daniel et al. ............ 360/97.01 |

* cited by examiner

Primary Examiner—John Barlow
Assistant Examiner—Tung S Lau
(74) Attorney, Agent, or Firm—Merchant & Gould PC

(57) ABSTRACT

A method includes selecting a subset of predictive frequencies from a set of disc drive frequencies consisting essentially of operational driving frequencies in the disc drive and system resonance frequencies in the disc drive. Correlation constants are determined that correlate sound power to mechanical vibration magnitudes at each of the frequencies in the subset of predictive frequencies. The method further includes acquiring mechanical vibration data from the disc drive while operating the disc drive and determining predictive vibration magnitudes at each of the frequencies in the subset of predictive frequencies from the mechanical vibration data. Finally, the method includes determining an estimated acoustic sound power value for the disc drive from the determined correlation constants and the predictive vibration magnitudes. A testing system determines an estimated acoustic sound power value for a subject disc drive from predetermined correlation constants and vibration magnitudes.

17 Claims, 12 Drawing Sheets

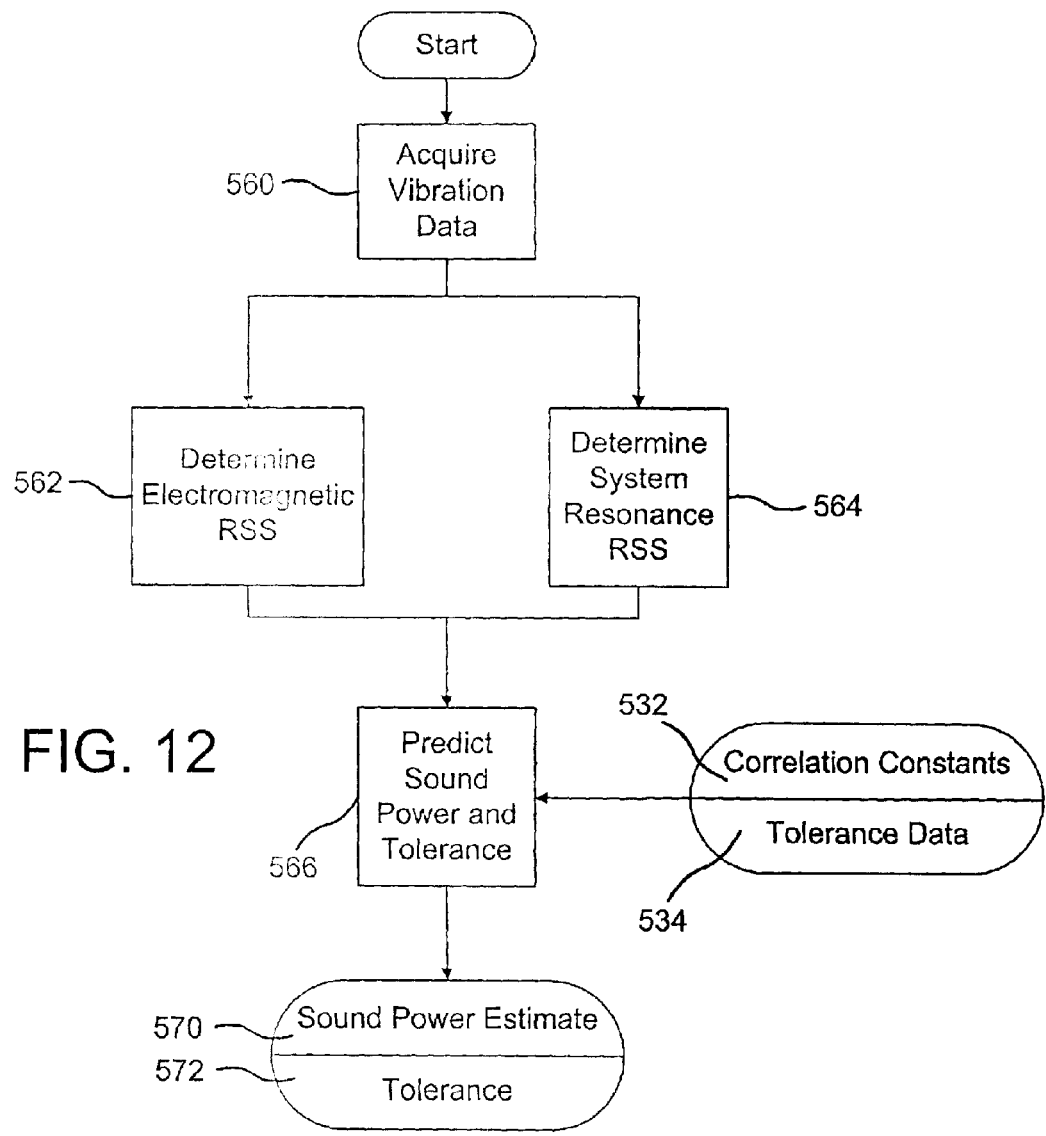

PREDICTING DISC DRIVE ACOUSTIC SOUND POWER FROM MECHANICAL VIBRATION

RELATED APPLICATIONS

This application claims priority of U.S. provisional application Serial No. 60/350,135, filed Jan. 17, 2002.

FIELD OF THE INVENTION

This application relates generally to predicting acoustic sound power and more particularly to predicting acoustic sound power from mechanical vibration in a disc drive.

BACKGROUND OF THE INVENTION

Disc drive customers are demanding increasingly quieter disc drives. This is especially apparent with the advent of personal video devices that include disc drives and often reside in bedrooms, operating while people sleep. The standard measure of acoustic noise in disc drives is sound power (Lwa), which is measured in bels or decibels (dB). Lwa is independent of the measuring environment because it accounts for factors such as the distance of microphones from the sound source, atmospheric pressure, etc.

However, Lwa is extremely difficult to measure. Presently, Lwa measurements are performed in expensive anechoic chambers and require electronic equipment, such as spectrum analyzers, computers, microphones, and signal conditioners.

Attempts have been made to use mechanical vibration measurements to estimate Lwa. One such method involves measuring the vibration at one or more points on the disc drive and then summing the energy in the vibration as a time domain root mean square (RMS) signal. Other methods involve taking a fast Fourier transform of the mechanical vibration and summing all the peaks in the frequency domain. None of the prior methods produced an acceptable correlation between mechanical vibration and Lwa.

Accordingly there is a need for a method and testing system that uses mechanical vibration to accurately estimate Lwa. The present invention provides a solution to this and other problems, and offers other advantages over the prior art.

SUMMARY OF THE INVENTION

Against this backdrop the present invention has been developed. An embodiment of the present invention may be described as a method of estimating acoustic sound power produced by a disc drive. The method includes selecting a subset of predictive frequencies from a set of disc drive frequencies consisting essentially of operational driving frequencies in the disc drive and system resonance frequencies in the disc drive. Correlation constants are determined that correlate sound power to mechanical vibration magnitudes at each of the frequencies in the subset of predictive frequencies. The method further includes acquiring mechanical vibration data from the disc drive while operating the disc drive and determining predictive vibration magnitudes at each of the frequencies in the subset of predictive frequencies from the mechanical vibration data. Finally, the method includes determining an estimated acoustic sound power value for the disc drive from the determined correlation constants and the predictive vibration magnitudes.

An embodiment of the present invention may be alternatively described as a method of correlating mechanical vibration to acoustic sound power of disc drives using a representative is group of disc drives. The method includes selecting a subset of predictive frequencies from a set of disc drive frequencies consisting essentially of operational driving frequencies in the group of disc drives and system resonance frequencies in the group of disc drives. The method also includes acquiring mechanical vibration data while operating each disc drive in the group of disc drives, and determining predictive mechanical vibration magnitudes at each of the predictive frequencies for each disc drive in the group of disc drives. The method further includes determining an operating acoustic sound power value for each disc drive in the group of disc drives and determining a correlation between vibration magnitude at the predictive frequencies and sound power using the determined mechanical vibration magnitudes and the determined operating acoustic sound power values.

Another embodiment of the present invention may be described as a testing system for estimating sound power values in a subject disc drive. The system includes a transducer communicating with the subject disc drive and producing vibration data including vibration magnitudes of the subject disc drive at a subset of predictive frequencies selected from a set of disc drive frequencies consisting essentially of operational driving frequencies in the subject disc drive and system resonance frequencies in the subject disc drive. The system also includes means for determining an estimated acoustic sound power value for the subject disc drive from predetermined correlation constants and the vibration magnitudes.

These and various other features as well as advantages which characterize the present invention will be apparent from a reading of the following detailed description and a review of the associated drawings.

BRIEF DESCRIPTION OF THE DRAWINGS

FIG. 12 is a process flow chart of a process for determining a sound power estimate and a tolerance for a subject disc drive using vibration magnitudes at system resonance frequencies and electromagnetic driving frequencies according to an embodiment of the present invention.

DETAILED DESCRIPTION

Figure 1:
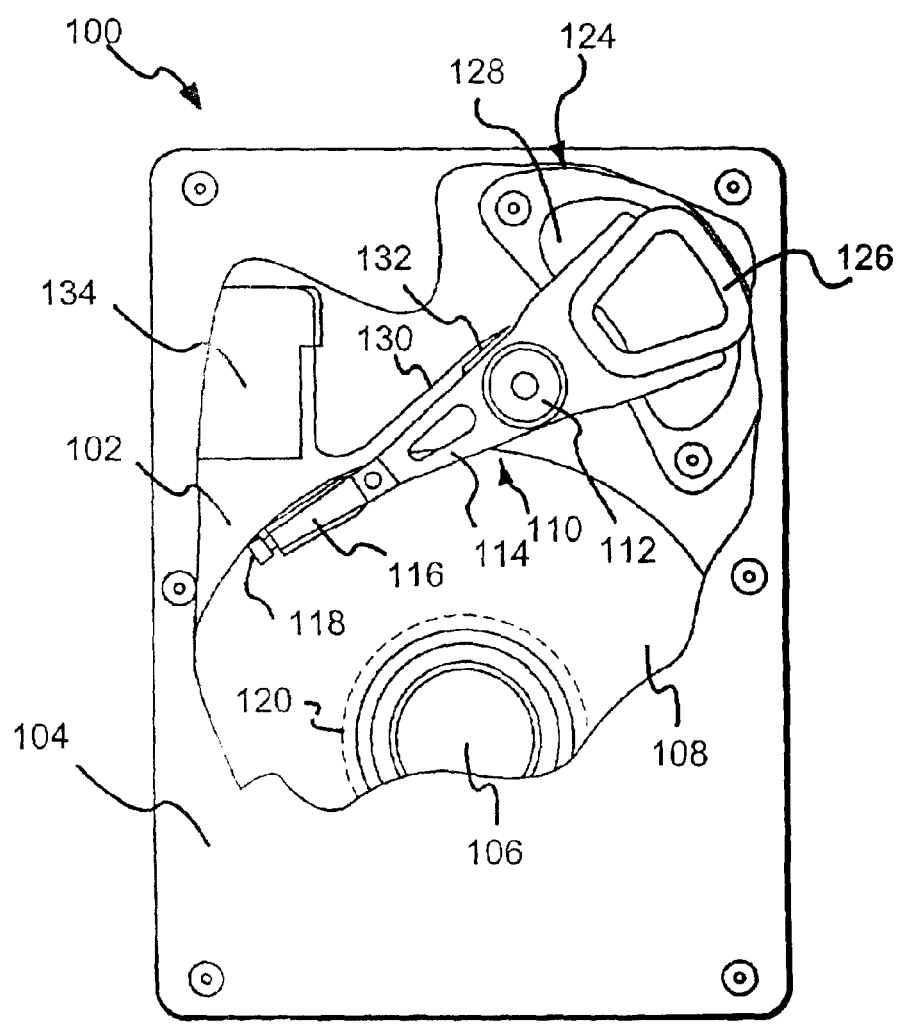
FIG. 1 is a plan view of a disc drive according to a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider, enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Embodiments of the present invention may be implemented either through hardware, i.e., logic devices, or as a computer-readable program storage device which tangibly embodies a program of instructions executable by a disc drive 100 or other computer system for estimating acoustic sound power produced by a subject disc drive using mechanical vibration data. As such, the logical operations of the various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 2:
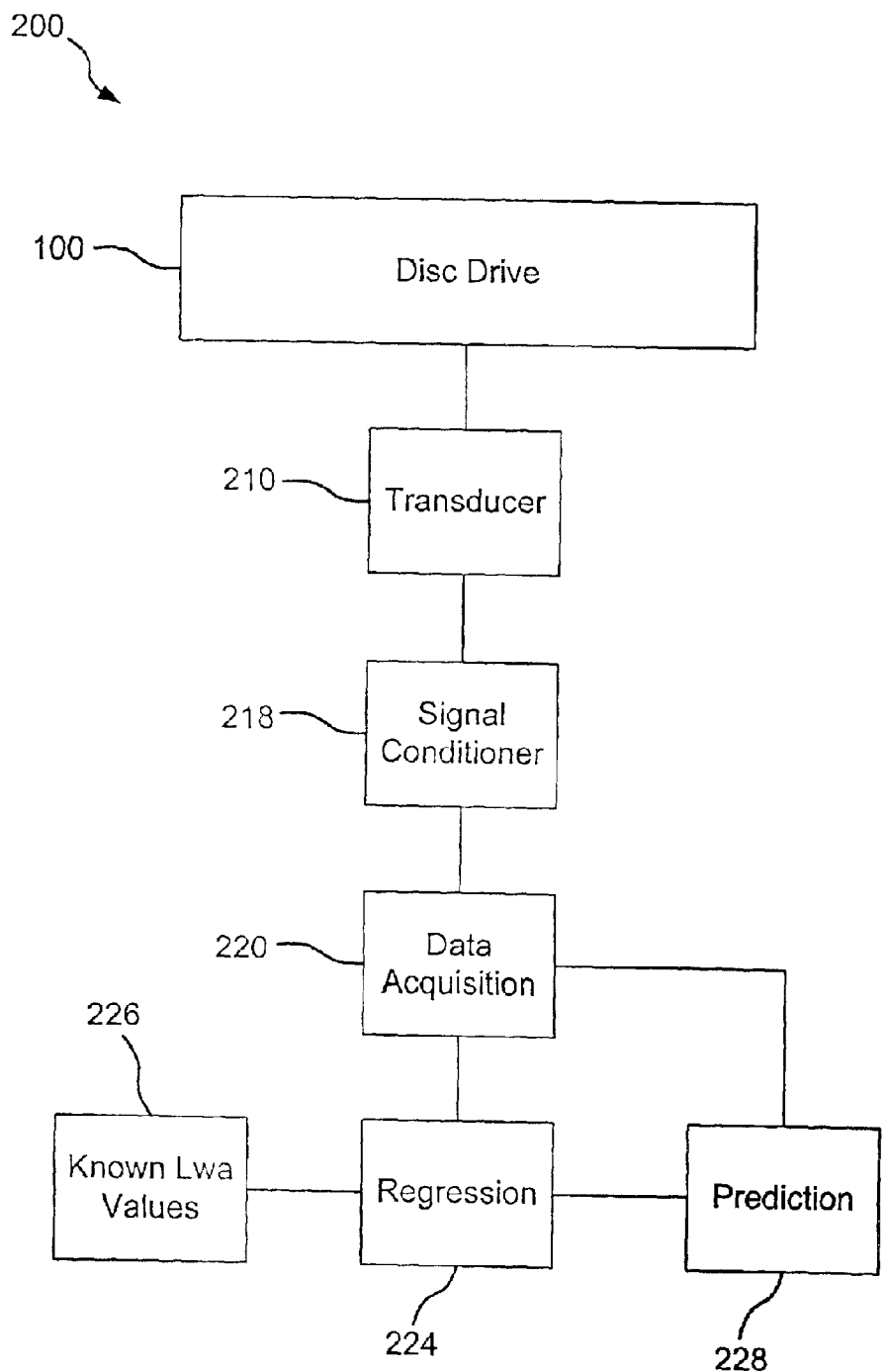
FIG. 2 is a schematic diagram of a testing system according to an embodiment of the present invention.
Figure 3:
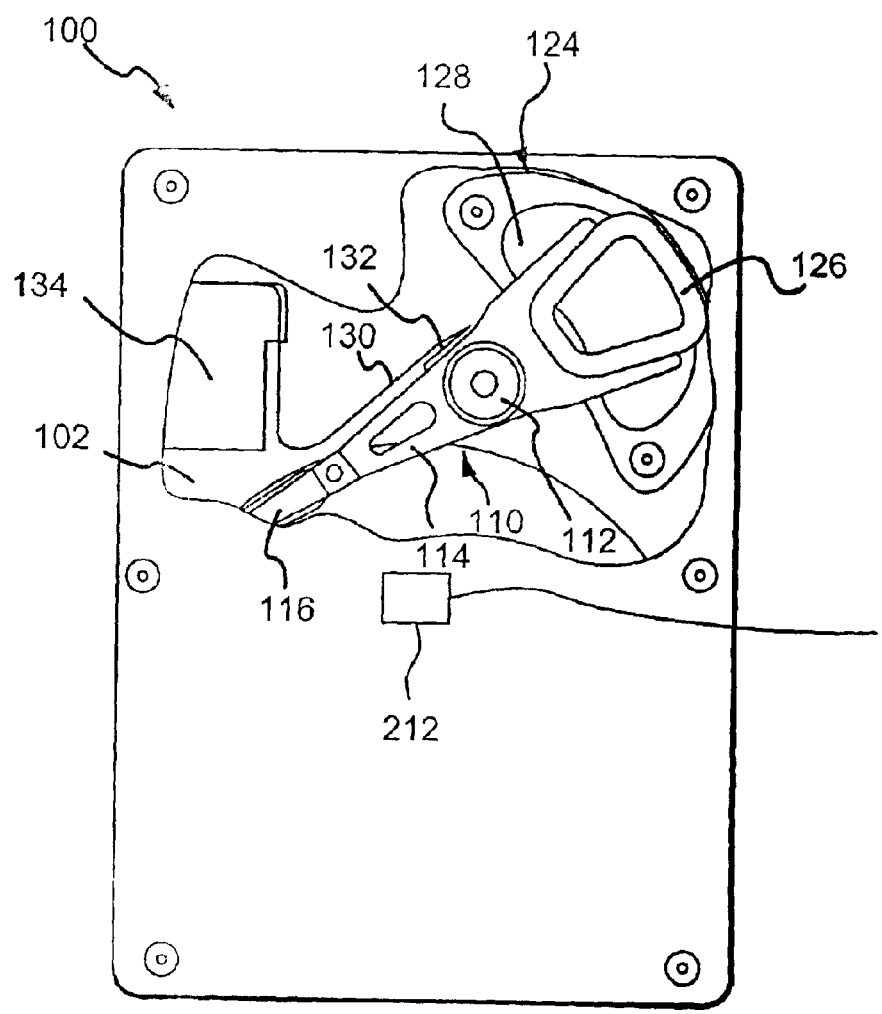
FIG. 3 is a plan view of the disc drive of FIG. 1, additionally illustrating an accelerometer mounted on the disc drive in accordance with an embodiment of the present invention.
Figure 4:
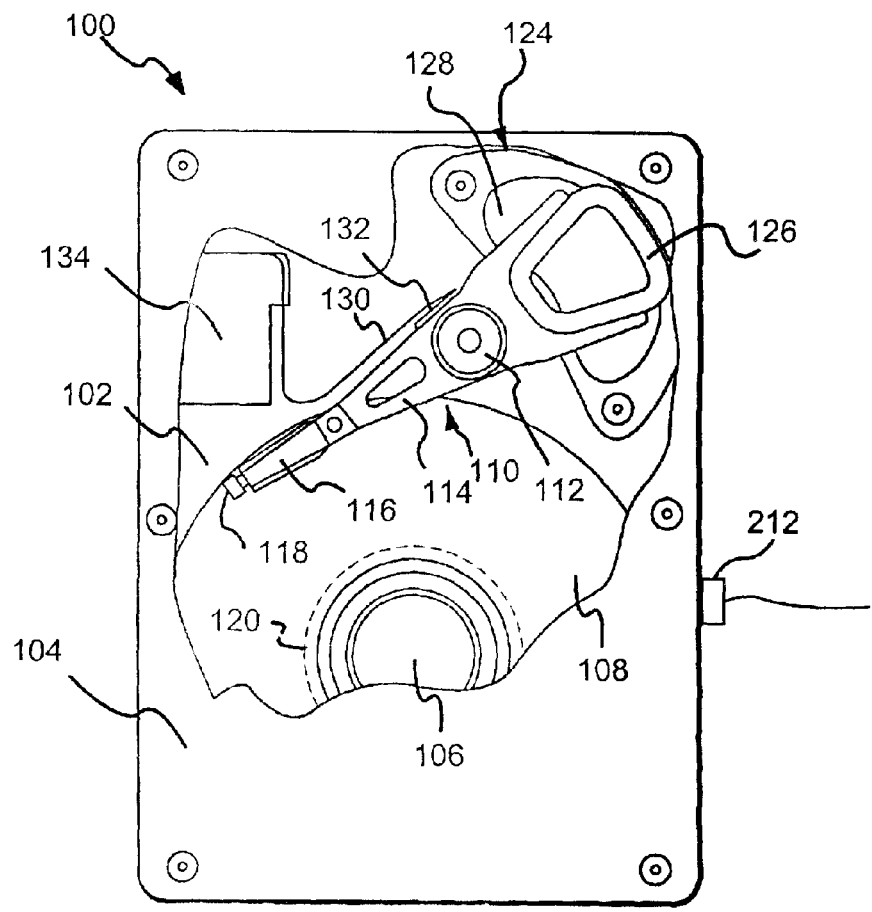
FIG. 4 is a plan view similar to FIG. 3, but illustrating the accelerometer mounted on a different position on the disc drive.

An acoustic sound power testing system 200 is illustrated in FIG. 2. The testing system 200 includes a disc drive 100 and a transducer 210 that communicates with the disc drive 100 to produce mechanical vibration data. In a preferred embodiment of the present invention, the transducer 210 is an accelerometer 212 shown in FIGS. 3–4. The accelerometer 212 is preferably mounted to the disc drive 100 in a position that will produce the most accurate correlation between the mechanical vibration data and Lwa. The terms correlation and correlate are not used herein to denote a particular type of statistical regression analysis, and they do not indicate that a causal link between variables must be found. Rather, they are used broadly to denote an analysis that yields a statistical relationship between at least two variables. In an embodiment where the spindle motor 106 is a ball bearing spindle motor, it has been found that mounting the accelerometer to a central position on the top cover 104 as shown in FIG. 3 produces good results. In an embodiment where the spindle motor 106 is a fluid dynamic bearing spindle motor, it has been found that mounting the accelerometer to a side of the base deck 102 adjacent to the discs 108 as shown in FIG. 4 produces good results. Alternatively, other transducers that sense mechanical vibrations could be used. For example, the transducer 210 could be a capacitance probe, a laser Doppler vibrometer, or a non-contact voltmeter, among others.

A standard signal conditioner 218 illustrated in FIG. 2 is coupled to the transducer 210 and conditions the signal produced by the transducer 210. A data acquisition module 220, such as a computer with a data acquisition card, receives the conditioned signal from the signal conditioner 218. The data acquisition module 220 also preferably performs a transform, such as a fast Fourier transform, to yield the vibration magnitudes at specific frequencies. A regression module 224 is coupled to the data acquisition module 220. The regression module 224 receives known Lwa values 226 and determines a correlation between the mechanical vibration data (preferably from a group of disc drives 100) received from the data acquisition module 220 and the known Lwa values 226. The known Lwa values 226 are preferably produced by an accepted sound power testing system, such as an anechoic chamber, and may be automatically passed to the regression module 224 or manually entered.

A prediction module 228 receives mechanical vibration data of a subject disc drive from the data acquisition module 220 and correlation information from the regression module 224. The prediction module 228 produces an estimated Lwa value using the mechanical vibration data and the correlation information.

Figure 5:
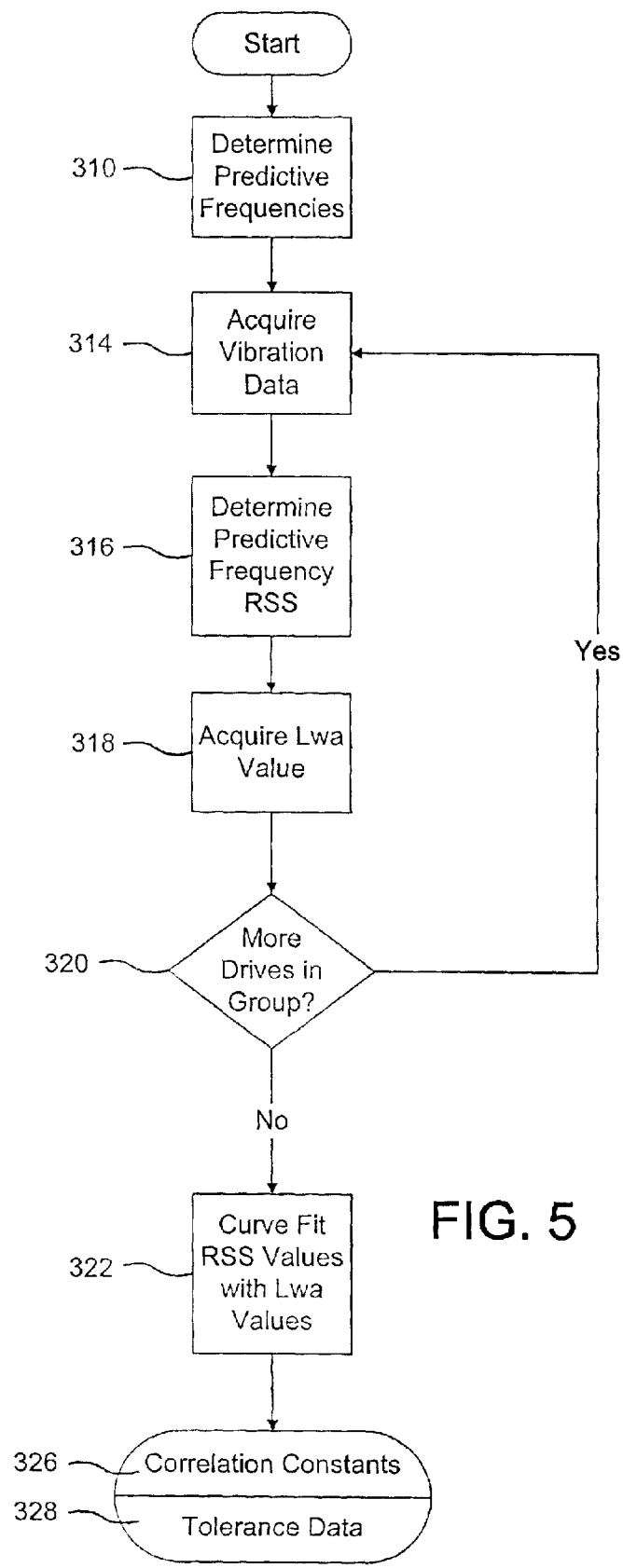
FIG. 5 is a process flow chart of a process for determining correlation constants and tolerance data in accordance with an embodiment of the present invention.

FIG. 5 illustrates a process flow for correlating mechanical vibration to acoustic sound power using a representative group of disc drives according to an embodiment of the present invention. A frequency determination operation 310 selects a subset of mechanical vibration frequencies that will be used to predict the Lwa of the disc drive 100. These predictive frequencies are preferably selected from the set of operating driving frequencies of the disc drive 100 (i.e., driving frequencies of the disc drive 100 at operating speed), and/or system resonance frequencies of the disc drive 100. System resonance frequencies are resonant frequencies of the structural components of the disc drive 100, such as the base 102, the top cover 104, the discs 108, the actuator arms 114, the flexures 116, and the coil 126. Additionally, the system resonance frequencies can include different modes of vibration, such as tilting, bending, and sway, for each of the structural components. Determination of operating driving frequencies is discussed in detail below.

A vibration acquisition operation 314 acquires vibration data from a particular disc drive 100 of a group of representative disc drives. Such vibration data preferably includes vibration magnitudes at each of the predictive frequencies for the particular disc drive 100 while the disc drive 100 is operating. The transducer 210, the signal conditioner 218, and the data acquisition module 220 preferably ascertain these vibration magnitudes as discussed above. An RSS operation 316 then preferably performs a root sum square calculation of the vibration magnitudes in the disc drive 100 at each of the predictive frequencies. As an example, where Mn is the vibration magnitude at the nth predictive frequency, the RSS would be calculated as:

$$RSS = \sqrt{M1^2 + M2^2 + M3^2 + M4^2 + \ldots Mn^2}$$

An Lwa acquisition operation 318 determines an Lwa value for the particular disc drive 100 of the group of representative disc drives. As discussed above, this is preferably done in an anechoic chamber. An additional drives query operation 320 then determines whether more disc drives 100 of the group of representative disc drives remain to be tested. If so, then the process flow returns to the vibration acquisition operation 314, which acquires vibration magnitudes at the predictive frequencies for another disc drive 100 of the group of representative disc drives. This operational loop between operations 314, 316, 318 and 320 continues until these operations have acquired RSS and Lwa values for all disc drives 100 of the group of representative disc drives.

When the additional drives query operation 320 determines that no disc drives of the representative group of disc drives remain to be tested, a curve fit operation 322 performs a curve fit of Lwa versus the predictive frequency vibration magnitude RSS for the group of disc drives. The curve fit operation 322 preferably yields correlation constants 326 and tolerance data 328. In a preferred embodiment, the curve fit operation 322 is a least squares curve fit operation. However, the curve fit operation 322 may be some other type of curve fit operation that correlates Lwa to the vibration magnitude RSS.

In one embodiment of the present invention, the curve fit operation 322 yields the following linear regression equation:

$$Est = A + B(RSS)$$

A and B are correlation constants produced by the curve fit operation 322, RSS is the RSS of the mechanical vibration magnitudes at the predictive frequencies, and Est is the estimated Lwa of a subject disc drive. However, the curve fit operation 322 may yield a non-linear regression equation.

Figure 6:
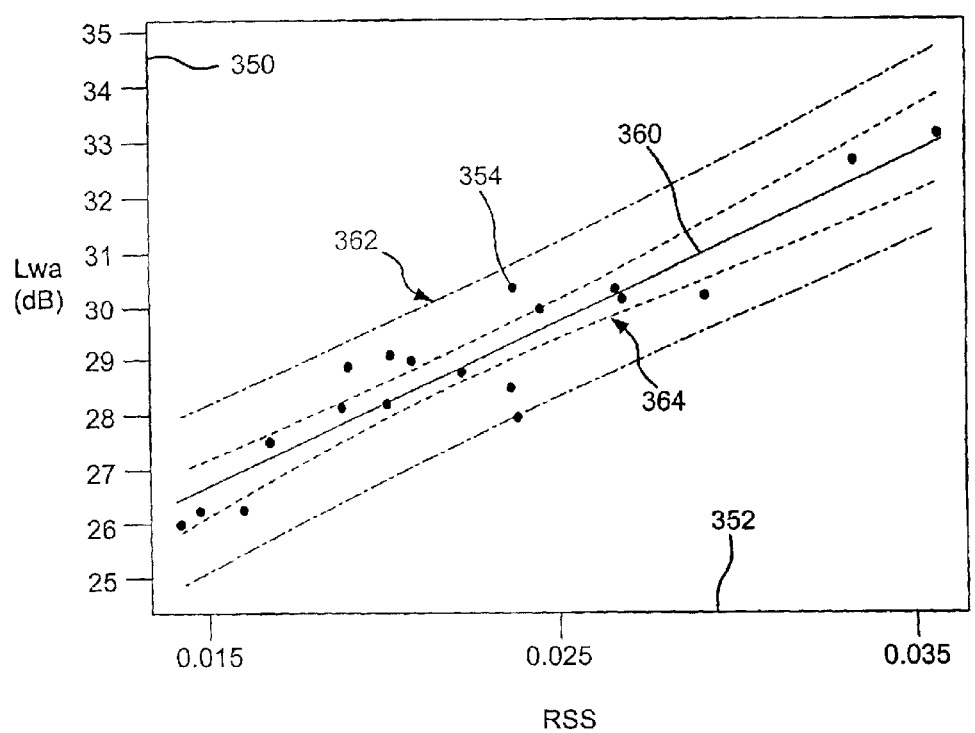
FIG. 6 is an illustration of a curve fit plot relating Lwa to the RSS of vibration magnitudes at selected frequencies in accordance with an embodiment of the present invention.

Referring to FIG. 6, a plot of a linear curve fit is illustrated. A vertical axis 350 represents Lwa and a horizontal axis 352 represents RSS. Data points 354 are plotted points representing the Lwa and RSS values for each disc drive 100 of the group of disc drives. A curve fit line 360 defined by the linear regression equation above correlates estimated Lwa values to given RSS values. The tolerance data 328 preferably also includes a prediction interval 362 and a confidence interval 364. Each interval 362 and 364 represents a range on either side of the curve fit line 360 within which a value can be predicted with a particular degree of certainty. The confidence interval 364 only accounts for a deviation range for the curve fit line, while the prediction interval 362 takes into account the possibility of deviation in a particular new measurement in addition to the deviation range for the curve fit line. As an example, if a subject disc drive 100 has an RSS of 0.025, the estimated Lwa for a subject disc drive 100 is about 29.5. The estimated Lwa and the confidence interval 364 define a range of about 29.5 plus or minus about 0.5, while the estimated Lwa and the prediction interval 362 define a range of about 29.5 plus or minus about 1.5.

The tolerance data 328 preferably also includes a common correlation coefficient given by the following equation:

$$R = \sqrt{\frac{\sum (Yi - Ybar)^2 - \sum (Yi - Yhat)^2}{\sum (Yi - Ybar)^2}}$$

R is the common correlation coefficient, Yi is the Lwa of a particular disc drive of the group of disc drives, Ybar is the mean Lwa for the group of disc drives, and Yhat is the predicted Lwa for a particular disc drive of the group of disc drives. Many commercially available software products that perform curve fit operations also perform this common correlation coefficient calculation. The common correlation coefficient, which ranges from one to zero, is a measure of the accuracy or precision of the curve fit. A common correlation coefficient value of one indicates a perfect curve fit that passes through every data point of the group of disc drives. A common correlation coefficient value of zero indicates a curve fit that represents no correlation between the subject variables. In one example that included only electromagnetic driving frequencies, the resulting common correlation coefficient value was about 0.89. In another example that included only ball bearing driving frequencies, the resulting common correlation coefficient value was about 0.94. Both of these indicate a correlation far better than prior attempts to correlate sound power to mechanical vibration.

Figure 7:
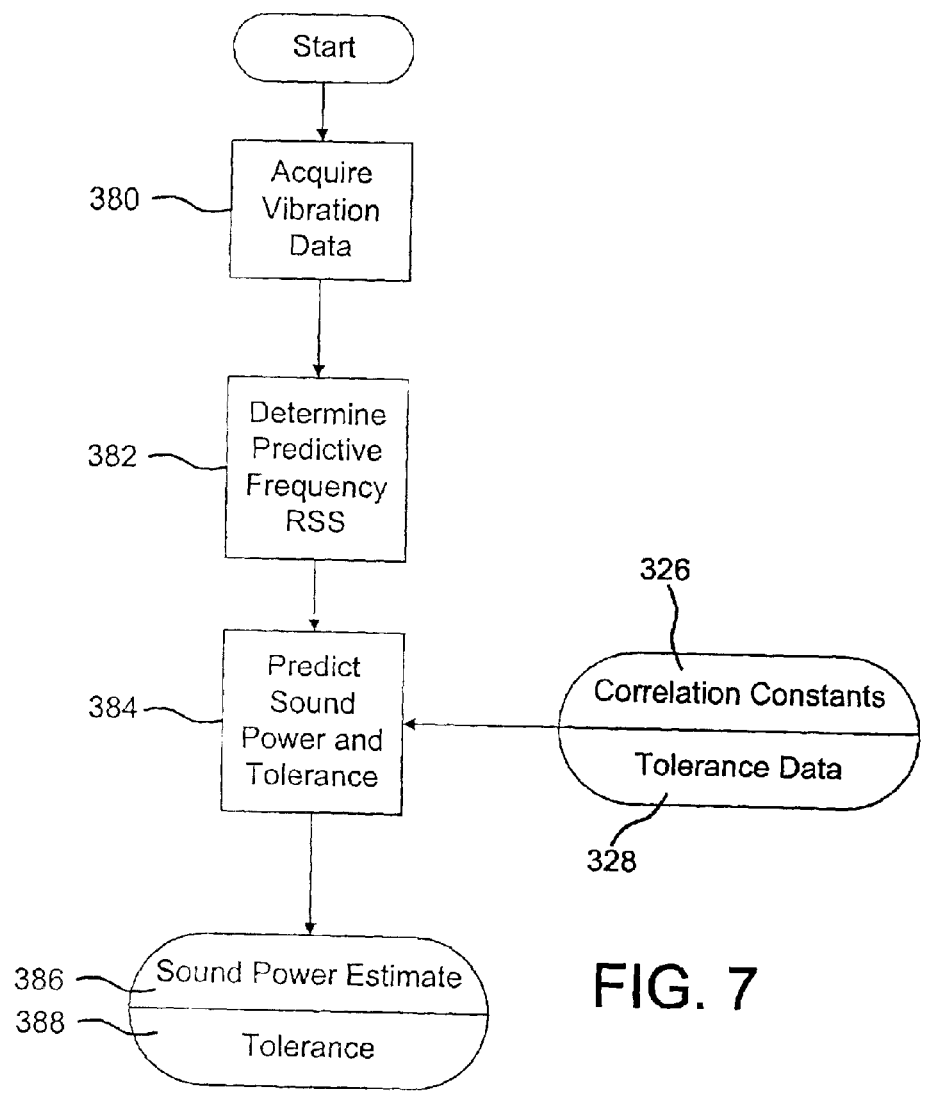
FIG. 7 is a process flow chart of a process for determining a sound power estimate and a tolerance for a subject drive.

FIG. 7 illustrates a process flow for estimating acoustic sound power produced by a subject disc drive 100 using the correlation constants 326 and the tolerance data 328. In vibration acquisition operation 380, vibration data is acquired. The vibration data includes vibration magnitudes at the predictive frequencies previously determined in frequency determination operation 310, and it is preferably acquired as described above with reference to vibration acquisition operation 314. In RSS operation 382, the RSS is calculated for the acquired vibration magnitudes as described above with reference to RSS operation 316. In predict sound power and tolerance operation 384, the correlation constants 326 and the RSS for the subject disc drive are used in the regression equation to produce a sound power estimate 386. The tolerance data 328 and the RSS for the subject disc drive are used to produce a tolerance or error range 388 for the prediction. The tolerance 388 and the sound power estimate 386 together define a sound power estimate range. The tolerance 388 may be either a prediction interval tolerance, a confidence interval tolerance or some other statistical tolerance value, depending on the desired degree of confidence in the sound power estimate range.

Figure 8:
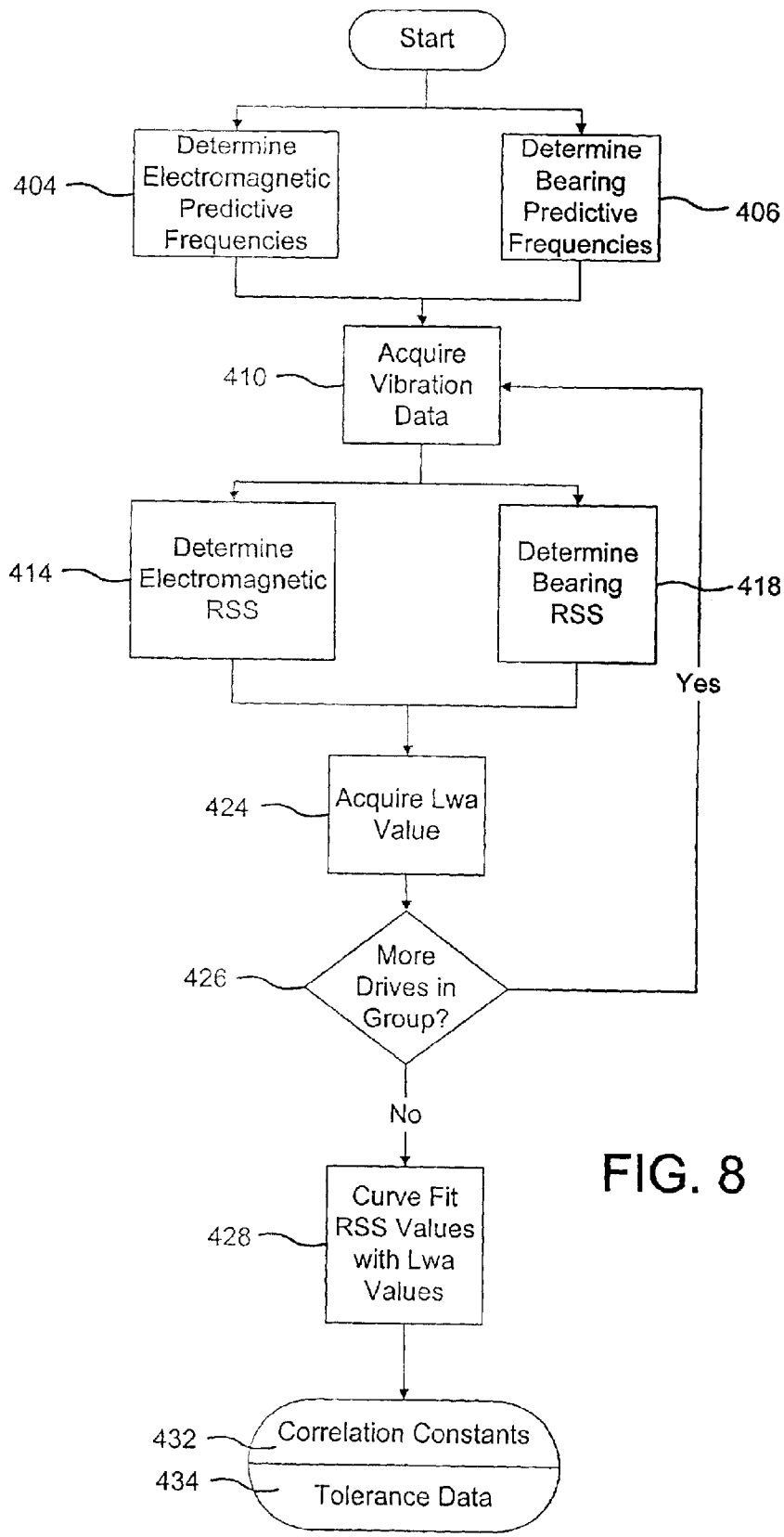
FIG. 8 is a process flow chart of a process for determining correlation constants and tolerance data using vibration magnitudes at electromagnetic and bearing driving frequencies according to an embodiment of the present invention.

FIG. 8 illustrates a process flow for determining correlation constants and tolerance data relating to disc drives having ball bearing spindle motors. The process uses two subsets of predictive frequencies chosen from the disc drive frequencies: bearing predictive frequencies and electromagnetic predictive frequencies. In determine electromagnetic frequencies operation 404, a subset of electromagnetic driving frequencies of the spindle motors 106 of a group of disc drives 100 are selected from the set of driving and resonance frequencies of the disc drives 100. As an example, such frequencies may be determined using the following equations:

$$\text{Slot} = \frac{S \pm \frac{P}{2}}{2}$$

$$\text{Flux} = \frac{(Q)(P)(N) \pm \frac{P}{2}}{2}$$

Switch is the lowest harmonic switch electromagnetic frequency; Slot is the lowest harmonic slot electromagnetic frequency; and Flux is the lowest harmonic flux electromagnetic frequency. The variables for calculating these frequencies are identified as follows: Fr is the rotational speed of the spindle motors 106 in Hz; S is the number of slots in the spindle motors 106; P is the number of poles in the spindle motors 106; Q is the number of phases in the spindle motors 106; and N is the flux order of the spindle motors 106. In addition to the lowest harmonic switch, slot, and flux frequencies given by the above equations, higher harmonics of those frequencies may also be selected as predictive frequencies.

In determine bearing predictive frequencies operation 406, a subset of bearing driving frequencies of the spindle motors 106 of a group of disc drives 100 are selected from the set of driving and resonance frequencies of the disc drives 100. As an example, such frequencies may be determined from the following equations:

$$Fc = Fri \frac{-\frac{d}{E}\cos B}{2} + Fro \frac{+\frac{d}{E}\cos B}{2}$$

$$Fb = E(Fri + Fro) \frac{1 - \frac{d^2}{E^2}(\cos B)^2}{2d}$$

Fri is the fundamental inner race rotational frequency; Fro is the fundamental outer race rotational frequency; Fc is the fundamental train frequency; Fb is the ball spin frequency; and Fi is the relative train frequency. The variables for calculating these frequencies are identified as follows: Inner and Outer Race Rotational Speeds are rotational speeds of the bearing races in Hz; d is the ball diameter; E is the pitch diameter; and B is the contact angle.

In vibration acquisition operation 410, vibration data is acquired from a particular disc drive 100 of a group of representative disc drives. The vibration acquisition operation 410 is similar to the vibration acquisition operation 314 described above, except that it includes determining the vibration magnitudes at the selected predictive ball bearing and electromagnetic frequencies that were selected in the determine electromagnetic frequencies operation 404 and the determine bearing frequencies operation 406.

In electromagnetic RSS operation 414, a root sum square value of the acquired magnitudes at each of the selected electromagnetic frequencies is calculated for the particular disc drive 100 using the RSS equation described above. Likewise, in bearing RSS operation 418, a root sum square value of the acquired magnitudes at each of the selected electromagnetic frequencies is calculated for a particular disc drive 100 in the group of representative disc drives using the RSS equation described above. An Lwa value is also acquired for the particular disc drive 100 in acquire Lwa value operation 424, as described above with reference to Lwa acquisition operation 318.

An additional drives query operation 426 then determines whether more disc drives 100 of the group of representative disc drives remain to be tested. If so, then the process flow returns to the vibration acquisition operation 410, which acquires vibration magnitudes at the predictive frequencies for another disc drive 100 of the group of representative disc drives. This operational loop between operations 410, 414, 418, 424, and 426 continues until it acquires electromagnetic RSS, bearing RSS, and Lwa values for all disc drives 100 of the group of representative disc drives.

When the additional drives query operation 426 determines that no drives of the representative group of disc drives remain to be tested, a curve fit operation 428 performs a curve fit of Lwa versus the two predictive frequency RSS's for the group of drives. The curve fit operation 428 preferably yields correlation constants 432 and tolerance data 434. In a preferred embodiment, the curve fit operation is a least squares curve fit operation.

In one embodiment of the present invention, the curve fit operation 428 yields the following multi-variable linear regression equation:

Est=$A+B$(Bearing $RSS$)+$C$(Electromagnetic $RSS$)

A, B, and C are correlation constants 432 produced by the curve fit operation 428, Bearing RSS is the RSS of the mechanical vibration magnitudes at the predictive ball bearing frequencies, Electromagnetic RSS is the RSS of the mechanical vibration magnitudes at the predictive electromagnetic driving frequencies, and Est is the estimated Lwa of a subject disc drive.

Figure 9:
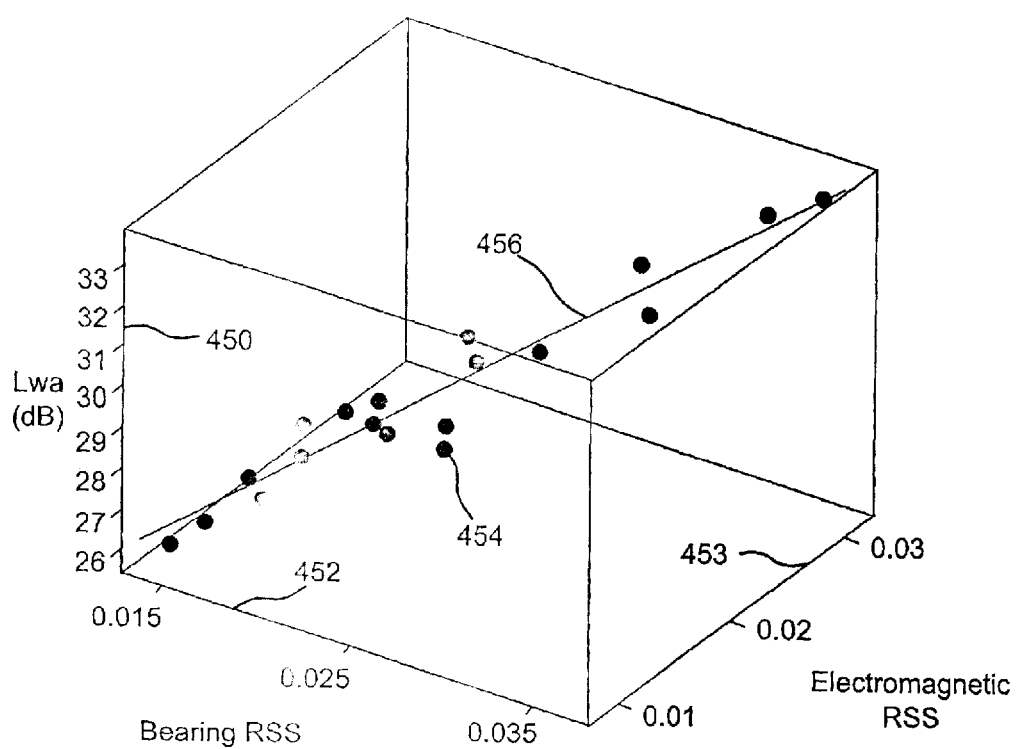
FIG. 9 is an illustration of a curve fit plot relating Lwa to the RSS of vibration magnitudes at bearing and electromagnetic driving frequencies according to an embodiment of the present invention.

Referring to FIG. 9, a plot of such a curve fit is illustrated. A vertical axis 450 represents Lwa, a horizontal bearing axis 452 represents bearing RSS, and a horizontal electromagnetic axis 453 represents electromagnetic RSS. Data points 454 are plotted points of each disc drive 100 of the group of representative disc drives. A curve fit line 456 is defined by the regression equation above and shows the estimated Lwa values for given RSS values.

Although not shown in FIG. 9, the tolerance data 434 preferably also includes a confidence interval and a prediction interval, as discussed above with reference to FIG. 6. The tolerance data 434 preferably also includes a common correlation coefficient (R), as discussed above. For example, in one embodiment that included bearing and electromagnetic RSS, a common correlation coefficient value of 0.918 was calculated, indicating a very good correlation in the curve fit.

The high common correlation coefficient values produced for curve fits in ball bearing disc drives indicate that the system and method of the present invention may be used in place of anechoic chambers for determining sound power in such drives. In fact, in testing nineteen disc drives, six of which were not used in the regression analysis that produced the correlation constants used for the tests, the difference between the sound power estimate according to the present invention and the sound power value produced by an anechoic chamber was less than 1.5 dB for every disc drive tested.

Figure 10:
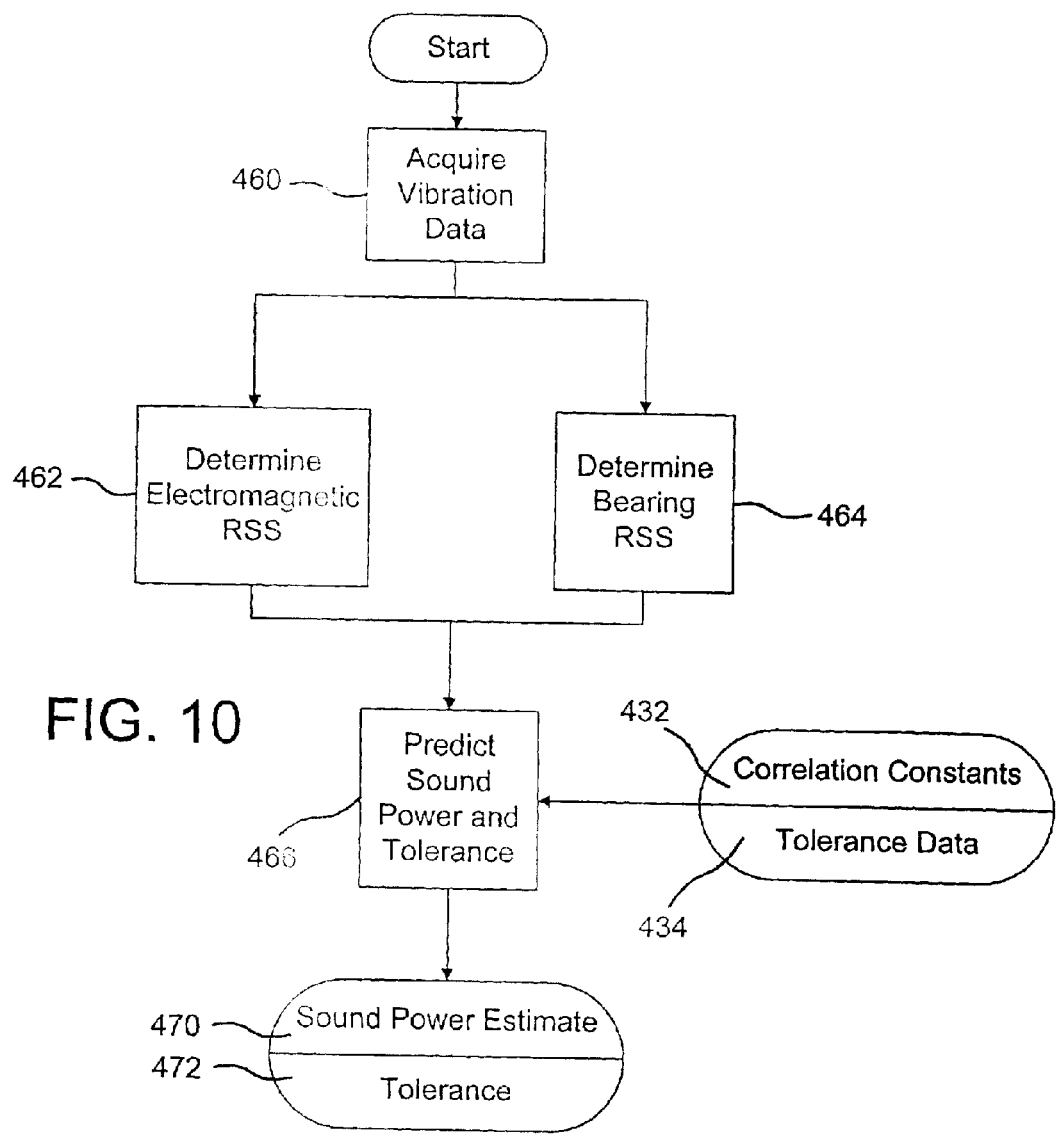
FIG. 10 is a process flow chart of a process for determining a sound power estimate and a tolerance for a subject disc drive using vibration magnitudes at bearing and electromagnetic driving frequencies according to an embodiment of the present invention.

FIG. 10 illustrates a process flow for estimating acoustic sound power produced by a subject disc drive 100 using the correlation constants 432 and the tolerance data 434 produced by curve fit operation 428 of FIG. 8. In vibration acquisition operation 460, vibration data is acquired. The vibration data includes vibration magnitudes at the predictive frequencies previously determined in determine electromagnetic frequencies operation 404 and determine bearing frequencies operation 406, and it is preferably acquired as described above with reference to vibration acquisition operation 314.

In electromagnetic RSS operation 462, the electromagnetic RSS is calculated for the acquired vibration magnitudes as described above with reference to RSS operation 316. Likewise, in bearing RSS operation 464, the bearing RSS is calculated for the acquired vibration magnitudes as described above with reference to RSS operation 316. In predict sound power and tolerance operation 466, the correlation constants 432, the electromagnetic RSS, and the bearing RSS for the subject disc drive are used in the multi-variable regression equation produced by the curve fit operation 428, thereby producing a sound power estimate 470. The tolerance data 434 and the two RSS values for the subject disc drive are used to produce a tolerance or error range 472 for the prediction. The tolerance 472 and the sound power estimate 470 together define a sound power estimate range. The tolerance 472 may be either a prediction interval tolerance, a confidence interval tolerance or some other statistical tolerance value, depending on the desired degree of confidence in the sound power estimate range.

Figure 11:
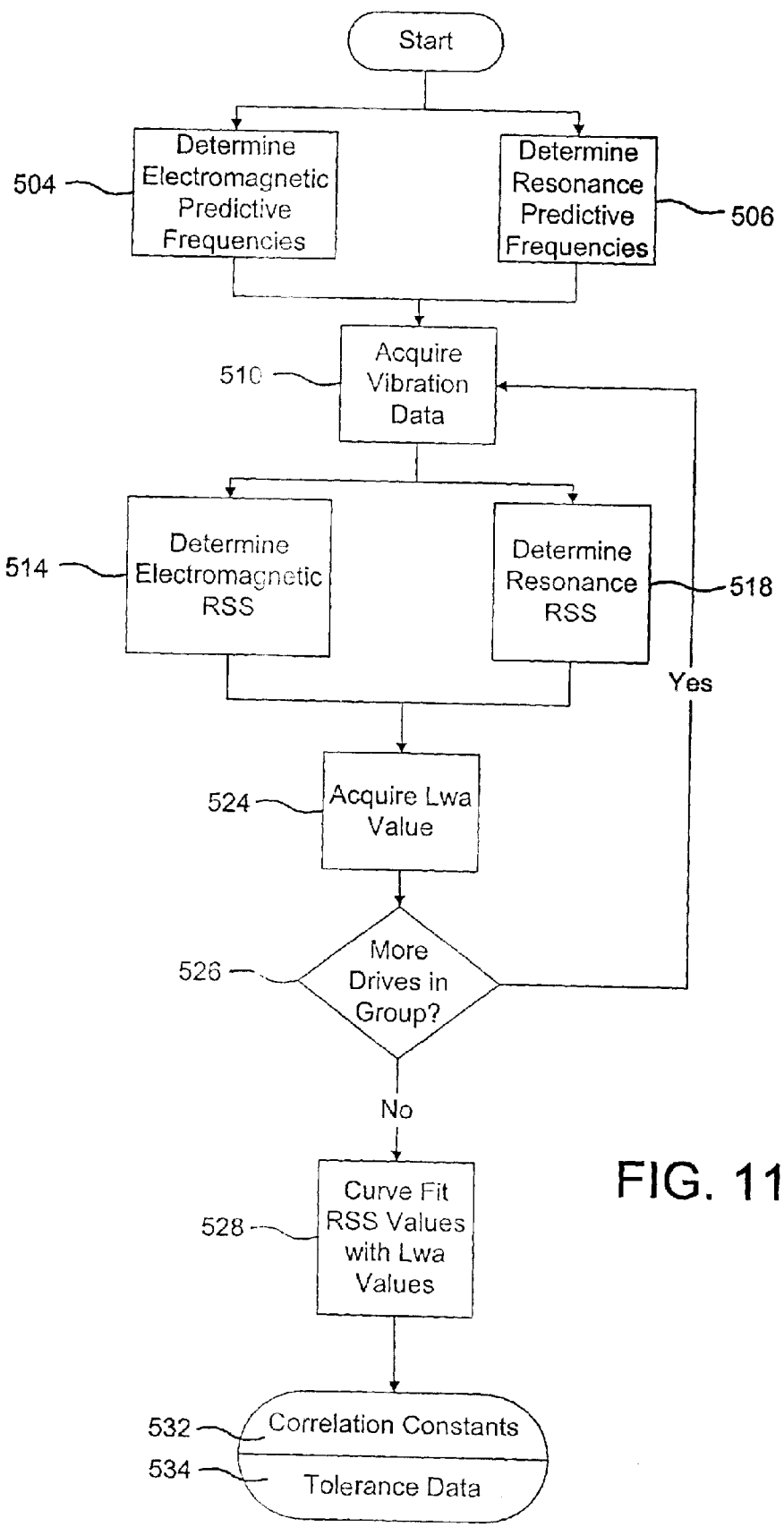
FIG. 11 is a process flow chart of a process for determining correlation constants and tolerance data using vibration magnitudes at system resonance frequencies and electromagnetic driving frequencies according to an embodiment of the present invention.

FIG. 11 illustrates a process flow for determining correlation constants and tolerance data relating to disc drives having fluid dynamic bearing spindle motors using two subsets of predictive frequencies chosen from the disc drive predictive frequencies: system resonance predictive frequencies and electromagnetic predictive frequencies. In determine electromagnetic frequencies operation 504, a subset of electromagnetic driving frequencies of the spindle motors 106 of a group of representative disc drives 100 are selected from the set of driving and resonance frequencies of the disc drives 100. This is preferably done as described above with reference to determine electromagnetic frequencies operation 404 of FIG. 8.

In determine resonance frequencies operation 506, a subset of system resonance frequencies of the spindle motors 106 of the group of disc drives 100 are selected from the set of driving and resonance frequencies of the disc drives 100. This is preferably done as described above with reference to frequency determination operation 310 of FIG. 5.

In vibration acquisition operation 510, vibration data is acquired from a particular disc drive 100 of a group of representative disc drives. The vibration acquisition operation 510 is similar to the vibration acquisition operation 314 described above, except that it includes determining the magnitudes at the selected predictive system resonance and electromagnetic frequencies that were selected in the determine electromagnetic frequencies operation 504 and the determine resonance frequencies operation 506.

In electromagnetic RSS operation 514, a root sum square value of the acquired magnitudes at each of the selected electromagnetic frequencies is calculated for a particular disc drive 100 using the RSS equation described above. Likewise, in resonance RSS operation 518, a root sum square value of the acquired magnitudes at each of the selected resonance frequencies is calculated for a particular disc drive 100 using the RSS equation described above. An Lwa value is also acquired for the particular disc drive 100 in acquire Lwa value operation 524, as described above with reference to Lwa acquisition operation 318.

An additional drives query operation 526 then determines whether more disc drives 100 of the group of representative disc drives remain to be tested. If so, then the process flow returns to the vibration acquisition operation 510, which acquires vibration magnitudes at the predictive frequencies for another disc drive 100 of the group of representative disc drives. This operational loop between operations 510, 514, 518, 524, and 526 continues until it determines electromagnetic RSS, resonance RSS, and Lwa values for all disc drives 100 of the group of representative disc drives.

When the additional drives query operation 526 determines that no drives of the representative group of disc drives remain to be tested, a curve fit operation 528 performs a curve fit of Lwa versus the two predictive frequency RSS's for the group of disc drives. The curve fit operation 528 preferably yields correlation constants 532 and tolerance data 534. In a preferred embodiment, the curve fit operation 528 is a least squares curve fit operation. In one embodiment of the present invention, the curve fit operation 528 yields the following multi-variable linear regression equation:

$$\mathrm{Est}=A+B(\mathrm{Resonance}\ RSS)+C(\mathrm{Electromagnetic}\ RSS)$$

A, B, and C are correlation constants produced by the curve fit operation 528, Resonance RSS is the RSS of the mechanical vibration magnitudes at the predictive system resonance frequencies, Electromagnetic RSS is the RSS of the mechanical vibration magnitudes at the predictive electromagnetic driving frequencies, and Est is the estimated Lwa of a subject disc drive. A plot of the curve fit is not shown, but it is similar to that shown in FIG. 9. The tolerance data 534 preferably also includes a confidence interval and a prediction interval, as discussed above with reference to FIG. 6. Additionally, the tolerance data 534 preferably includes a common correlation coefficient (R), as discussed above. As an example, in one embodiment that used system resonance and electromagnetic RSS predictive frequencies, a common correlation coefficient value of 0.63 was calculated, indicating a good correlation in the curve fit. While a correlation with a common correlation coefficient value of only 0.63 may not be sufficient to fully replace Lwa testing in anechoic chambers, it could be very useful as a quick and inexpensive method of detecting disc drives with extreme noise.

FIG. 12 illustrates a process flow for estimating acoustic sound power produced by a subject disc drive 100 using the correlation constants 532 and the tolerance data 534 produced by curve fit operation 528. In vibration acquisition operation 560, vibration data is acquired. The vibration data includes vibration magnitudes at the predictive frequencies previously determined in determine electromagnetic frequencies operation 504 and determine resonance frequencies operation 506, and it is preferably acquired as described above with reference to vibration acquisition operation 314.

In electromagnetic RSS operation 562, the electromagnetic RSS is calculated for the acquired vibration magnitudes at the selected electromagnetic driving frequencies, as described above with reference to RSS operation 316. Likewise, in resonance RSS operation 564, the resonance RSS is calculated for the acquired vibration magnitudes at the selected system resonance frequencies, as described above with reference to RSS operation 316. In predict sound power and tolerance operation 566, the correlation constants 532, the electromagnetic RSS, and the bearing RSS for the subject disc drive are used in the multi-variable regression equation produced by the curve fit operation 528 to produce a sound power estimate 570. The tolerance data 534 and the two RSS values for the subject disc drive are then used to produce a tolerance or error range 572 for the prediction. The tolerance 572 and the sound power estimate 570 together define a sound power estimate range. The tolerance 572 may be either a prediction interval tolerance, a confidence interval tolerance or some other statistical tolerance value, depending on the desired degree of confidence in the sound power estimate range.

An embodiment of the present invention may be summarized as a method of estimating acoustic sound power produced by a disc drive (such as 100). The method includes selecting a subset of predictive frequencies from a set of disc drive frequencies consisting essentially of operational driving frequencies in the disc drive and system resonance frequencies in the disc drive. Correlation constants (such as 326, 432, or 532) are determined that correlate sound power to mechanical vibration magnitudes at each of the frequencies in the subset of predictive frequencies. The method further includes acquiring mechanical vibration data from the disc drive while operating the disc drive and determining predictive vibration magnitudes at each of the frequencies in the subset of predictive frequencies from the mechanical vibration data. Finally, the method includes determining an estimated acoustic sound power value (such as 386, 470, or 570) for the disc drive from the correlation constants and the predictive vibration magnitudes.

Determining the correlation constants preferably includes acquiring mechanical vibration data while operating each disc drive in a group of disc drives and determining predictive mechanical vibration magnitudes at each of the predictive frequencies for each disc drive in the group of disc drives. An operating acoustic sound power value for each disc drive in the group of disc drives is determined and mechanical vibration magnitudes at the predictive frequencies are correlated to sound power to determine the correlation constants using the determined mechanical vibration magnitudes and the determined operating acoustic sound power values. Preferably, correlating vibration magnitude to sound power includes calculating predictive root sum square values including a root sum square of the predictive vibration magnitudes for each disc drive, and correlating the predictive root sum square values to sound power. Correlating the predictive root sum square values to sound power preferably includes performing a curve fit, which may be a linear curve fit.

The method may further include determining an error range (such as 388) of the estimated acoustic sound power value. The error range determination may include determining a confidence interval (such as 364) and/or determining a prediction interval (such as 362).

The subset of predictive frequencies may include a first subset of ball bearing driving frequencies of a ball bearing within a spindle motor (such as 106) in the disc drive, and it may further include a second subset of electromagnetic driving frequencies of the spindle motor. In another embodiment, the subset of predictive frequencies may include a first subset of disc drive system resonance frequencies and a second subset of electromagnetic driving frequencies of a spindle motor (such as 106) in the disc drive.

Stated another way, an embodiment of the present invention may be summarized as a method of correlating mechanical vibration to acoustic sound power of disc drives using a representative group of disc drives. The method includes selecting a subset of predictive frequencies from a set of disc drive frequencies consisting essentially of operational driving frequencies in the group of disc drives and system resonance frequencies in the group of disc drives. The method also includes acquiring mechanical vibration data while operating each disc drive (such as 100) in the group of disc drives, and determining predictive mechanical vibration magnitudes at each of the predictive frequencies for each disc drive in the group of disc drives. The method further includes determining an operating acoustic sound power value for each disc drive in the group of disc drives and determining a correlation between vibration magnitude at the predictive frequencies and sound power using the determined mechanical vibration magnitudes and the determined operating acoustic sound power values.

Determining a correlation may include calculating predictive root sum square values including a root sum square of the predictive vibration magnitudes for each disc drive, and correlating the predictive root sum square values to sound power. Moreover, correlating the predictive root sum square values to sound power preferably includes performing a regression analysis that includes a curve fit.

The subset of predictive frequencies may include a first subset of driving frequencies of a ball bearing within a disc drive spindle motor (such as 106) and a second subset of electromagnetic driving frequencies of the spindle motor. Moreover, calculating predictive root sum square values may include calculating a first root sum square value of the first subset of driving frequencies and a second root sum square value of the second subset of driving frequencies. Alternatively, the subset of predictive frequencies may include a first subset of disc drive system resonance frequencies and a second subset of electromagnetic driving frequencies of the spindle motor. If so, then calculating predictive root sum square values may include calculating a first root sum square value of the first subset of resonance frequencies and a second root sum square value of the second subset of driving frequencies. The method may additionally include determining a common correlation coefficient value of the correlation between vibration magnitude at the predictive frequencies and sound power.

Stated yet another way, an embodiment of the present invention may be summarized as a testing system (such as 200) for estimating sound power values in a subject disc drive (such as 100). The system includes a transducer (such as 210) communicating with the subject disc drive and producing vibration data including vibration magnitudes of the subject disc drive at a subset of predictive frequencies selected from a set of disc drive frequencies consisting essentially of operational driving frequencies in the subject disc drive and system resonance frequencies in the subject disc drive. The system also includes means for determining an estimated acoustic sound power value (such as 386, 470, and 570) for the subject disc drive from predetermined correlation constants (such as 326, 432, and 532) and the vibration magnitudes. The transducer is preferably an accelerometer (such as 212) mounted on the disc drive.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the predictive frequencies may include any of the disc drive driving and resonance frequencies discussed, as well as others not specifically enumerated above. Additionally, frequencies other than driving and resonance frequencies may be included in the analysis so long as they do not significantly affect the estimated sound power values. Numerous other changes may be made which will readily suggest themselves to those skilled in the art and which are encompassed in the spirit of the invention disclosed and as defined in the appended claims.

What is claimed is:

1. A method of estimating acoustic sound power produced by a disc drive using mechanical vibration data acquired while operating the disc drive, the method comprising steps of:

selecting a subset of predictive frequencies from a set of disc drive frequencies consisting essentially of operational driving frequencies in the disc drive and system resonance frequencies in the disc drive;

acquiring mechanical vibration data while operating each disc drive in a group of disc drives;

determining predictive mechanical vibration magnitudes at each of the predictive frequencies for each disc drive in the group of disc drives;

determining an operating acoustic sound power value for each disc drive in the group of disc drives; and correlating mechanical vibration magnitude at the predictive frequencies to sound power to determine the correlation constants using the determined mechanical vibration magnitudes and the determined operating acoustic sound power values;

determining predictive vibration magnitudes at each of the frequencies in the subset of predictive frequencies from the mechanical vibration data; and determining an estimated acoustic sound power value for the disc drive from the correlation constants and the predictive vibration magnitudes, wherein the step of correlating vibration magnitude to sound power comprises steps of:

calculating predictive root sum square values including a root sum square of the predictive vibration magnitudes for each disc drive; and correlating the predictive root sum square values to sound power.

2. The method of claim 1, wherein the step of correlating the predictive root sum square values to sound power comprises a step of performing a curve fit.

3. The method of claim 2, wherein the curve fit is a linear curve fit.

4. A method of estimating acoustic sound power produced by a disc drive using mechanical vibration data acquired while operating the disc drive, the method comprising steps of:

selecting a subset of predictive frequencies from a set of disc drive frequencies consisting essentially of operational driving frequencies in the disc drive and system resonance frequencies in the disc drive;

determining correlation constants that correlate sound power to mechanical vibration magnitudes at each of the frequencies in the subset of predictive frequencies;

acquiring mechanical vibration data from the disc drive while operating the disc drive;

determining predictive vibration magnitudes at each of the frequencies in the subset of predictive frequencies from the mechanical vibration data; and determining an estimated acoustic sound power value for the disc drive from the correlation constants and the predictive vibration magnitudes, wherein the disc drive comprises a spindle motor rotating a disc and wherein the subset of predictive frequencies comprises a first subset of ball bearing driving frequencies of a ball bearing within the spindle motor.

5. The method of claim 4, wherein the subset of predictive frequencies further comprises a second subset of electromagnetic driving frequencies of the spindle motor.

6. A method of estimating acoustic sound power produced by a disc drive using mechanical vibration data acquired while operating the disc drive, the method comprising steps of:

selecting a subset of predictive frequencies from a set of disc drive frequencies consisting essentially of operational driving frequencies in the disc drive and system resonance frequencies in the disc drive;

determining correlation constants that correlate sound power to mechanical vibration magnitudes at each of the frequencies in the subset of predictive frequencies;

acquiring mechanical vibration data from the disc drive while operating the disc drive;

determining predictive vibration magnitudes at each of the frequencies in the subset of predictive frequencies from the mechanical vibration data; and determining an estimated acoustic sound power value for the disc drive from the correlation constants and the predictive vibration magnitudes, wherein the subset of predictive frequencies comprises a first subset of disc drive system resonance frequencies and wherein the disc drive comprises a spindle motor rotating a disc and wherein the subset of predictive frequencies comprises a second subset of electromagnetic driving frequencies of the spindle motor.

7. A method of correlating mechanical vibration to acoustic sound power of disc drives using a representative group of disc drives, the method comprising:

selecting a subset of predictive frequencies from a set of disc drive frequencies consisting essentially of operational driving frequencies in the group of disc drives and system resonance frequencies in the group of disc drives;

acquiring mechanical vibration data while operating each disc drive in the group of disc drives;

determining predictive mechanical vibration magnitudes at each of the predictive frequencies for each disc drive in the group of disc drives;

determining an operating acoustic sound power value for each disc drive in the group of disc drives; and determining a correlation between vibration magnitude at the predictive frequencies and sound power using the determined mechanical vibration magnitudes and the determined operating acoustic sound power values comprising steps of, calculating predictive root sum square values including a root sum square of the predictive vibration magnitudes for each disc drive; and correlating the predictive root sum square values to sound power.

8. The method of claim 7, wherein the step of correlating the predictive root sum square values to sound power comprises a step of performing a regression analysis that includes performing a curve fit.

9. The method of claim 7, wherein each disc drive comprises a spindle motor rotating a disc and wherein the subset of predictive frequencies comprises a first subset of driving frequencies of a ball bearing within the spindle motor.

10. The method of claim 7, wherein the disc drive comprises a spindle motor rotating a disc and wherein the subset of predictive frequencies comprises a first subset of disc drive system resonance frequencies and a second subset of electromagnetic driving frequencies of the spindle motor.

11. The method of claim 9, wherein the subset of predictive frequencies further comprises a second subset of electromagnetic driving frequencies of the spindle motor.

12. The method of claim 10, wherein the step of calculating predictive root sum square values comprises calculating a first root sum square value of the first subset of resonance frequencies and a second root sum square value of the second subset of driving frequencies.

13. The method of claim 11, wherein the step of calculating predictive root sum square values comprises calculating a first root sum square value of the first subset of driving frequencies and a second root sum square value of the second subset of driving frequencies.

14. A testing system for estimating sound power values in a subject disc drive, the system comprising:

a transducer communicating with the subject disc drive and producing vibration data including vibration magnitudes of the subject disc drive at a subset of predictive frequencies selected from a set of disc drive frequencies consisting essentially of operational driving frequencies in the subject disc drive and system resonance frequencies in the subject disc drive; and means for determining an estimated acoustic sound power value for the subject disc drive from predetermined correlation constants and the vibration magnitudes, wherein the means for determining the estimated acoustic sound power value comprises means for:
calculating predictive root sum square values including a root sum square value of the predictive vibration magnitudes for the subject disc drive; and
inserting the root sum square values in an equation that includes the correlation constants and relates the root sum square values to estimated sound power.

15. A testing system for estimating sound power values in a subject disc drive, the system comprising:

a transducer communicating with the subject disc drive and producing vibration data including vibration magnitudes of the subject disc drive at a subset of predictive frequencies selected from a set of disc drive frequencies consisting essentially of operational driving frequencies in the subject disc drive and system resonance frequencies in the subject disc drive; and means for determining an estimated acoustic sound power value for the subject disc drive from predetermined correlation constants and the vibration magnitudes, wherein the disc drive comprises a spindle motor rotating a disc and wherein the subset of predictive frequencies comprises a first subset of driving frequencies of a ball bearing within the spindle motor and a second subset of electromagnetic driving frequencies of the spindle motor.

16. A testing system for estimating sound power values in a subject disc drive, the system comprising:

a transducer communicating with the subject disc drive and producing vibration data including vibration magnitudes of the subject disc drive at a subset of predictive frequencies selected from a set of disc drive frequencies consisting essentially of operational driving frequencies in the subject disc drive and system resonance frequencies in the subject disc drive; and means for determining an estimated acoustic sound power value for the subject disc drive from predetermined correlation constants and the vibration magnitudes, wherein the disc drive comprises a spindle motor rotating a disc and wherein the subset of predictive frequencies comprises a first subset of disc drive system resonance frequencies and a second subset of electromagnetic driving frequencies of the spindle motor.

17. A testing system for estimating sound power values in a subject disc drive, the system comprising:

a transducer communicating with the subject disc drive and producing vibration data including vibration magnitudes of the subject disc drive at a subset of predictive frequencies selected from a set of disc drive frequencies consisting essentially of operational driving frequencies in the subject disc drive and system resonance frequencies in the subject disc drive; and means for determining an estimated acoustic sound power value for the subject disc drive from predetermined correlation constants and the vibration magnitudes, wherein the transducer is an accelerometer mounted on the disc drive.

* * * * *